United States Patent
Benneyworth et al.

(10) Patent No.: US 6,704,145 B1
(45) Date of Patent: Mar. 9, 2004

(54) AIR-GAP OPTICAL STRUCTURE HAVING THE AIR GAP DEFINED BY A LAYERED SPACER STRUCTURE

(75) Inventors: Edward Benneyworth, Midland (CA); Conrad Stenton, Midland (CA); Alexandre Lifchits, Wyevale (CA); John Bowron, Pentanguishene (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/236,260

(22) Filed: Sep. 4, 2002

(51) Int. Cl.[7] ............ G02B 27/12; G02B 5/04; B05D 5/06
(52) U.S. Cl. ............ 359/640; 359/833; 427/166
(58) Field of Search ............ 359/638, 640, 359/833; 427/166

(56) References Cited

U.S. PATENT DOCUMENTS

| | | | |
|---|---|---|---|
| 4,084,180 A | 4/1978 | Stoffels et al. | 348/338 |
| RE30,513 E * | 2/1981 | Bleukens et al. | 348/388 |
| 4,784,469 A | 11/1988 | Tsukada et al. | 359/638 |
| 5,066,101 A * | 11/1991 | Aoki et al. | 359/638 |
| 5,327,289 A | 7/1994 | Watanabe et al. | 359/634 |
| 5,900,984 A | 5/1999 | Yamanaka et al. | 359/638 |
| 5,905,545 A | 5/1999 | Poradish et al. | 348/743 |
| 6,144,504 A * | 11/2000 | Sudoh et al. | 359/811 |
| 6,349,006 B1 * | 2/2002 | Okamori et al. | 359/834 |

* cited by examiner

Primary Examiner—David N. Spector
(74) Attorney, Agent, or Firm—William C. Schubert; Glenn H. Lenzen, Jr.

(57) ABSTRACT

An air-gap optical structure is fabricated by depositing a metallic spacer structure on a first transmissive optical element, and then contacting a second transmissive optical element to the spacer structure so that the spacer structure lies between the first transmissive optical element and the second transmissive optical element and defines an air gap therebetween. A first layer of the spacer structure contacts the first transmissive optical element, and a second layer of the spacer structure contacts the first layer. The first layer is preferably deposited by vapor deposition and is relatively thin, and the second layer is preferably electroless deposited and is relatively thick. The total thickness of the spacer structure is typically from about 5 to about 15 micrometers.

20 Claims, 3 Drawing Sheets

AIR-GAP OPTICAL STRUCTURE HAVING THE AIR GAP DEFINED BY A LAYERED SPACER STRUCTURE

This invention relates to an air-gap optical structure and, more particularly, to such an air-gap optical structure wherein the optical elements are spaced apart by a layered metallic spacer structure.

BACKGROUND OF THE INVENTION

Air-gap optical structures are widely used in optical systems. In an example, two prisms separated by an air gap are used in some designs of reflective digital micromirror device (DMD) projectors. The air-gap optical structure provides for total internal reflection at an air-gap face for some incident angles of light, but transmission through the air-gap face for other incident angles of light. In the projector, an incident beam is reflected from the air-gap face to the reflective DMD display under conditions of total internal reflection, reflected from the DMD display according to the image thereon and back toward the air-gap face, and passed through the air-gap face under transmission conditions for viewing.

The air-gap optical structure is formed by providing two transmissive optical elements (such as prisms or lenses) of the proper shapes, and placing them together in a facing relationship with the air gap defined between the adjacent faces. A number of techniques have been used to form the air gap. For example, in various instances metal shims, plastic tapes, and spacer balls have been placed between the adjacent faces to define the air gap. These approaches are all operable to some extent, but have shortcomings in that the position of the spacer may shift or the thickness of the spacer may change over time and under various service conditions. Shims and similar spacer devices are difficult to work with in thicknesses that define air-gap spacings of 20 micrometers or more. They become nearly impossible to work with in thicknesses that define air-gap spacings of about 5–15 micrometers, as is required for some applications. Additionally, they are not available in such small dimensions in many cases, and in other cases are available from manufacturers only in specific dimensions selected by the manufacturers.

There is consequently a need for an improved approach to the fabrication of air-gap optical structures. The present invention fulfills this need, and further provides related advantages.

SUMMARY OF THE INVENTION

The present invention provides an air-gap optical structure in which the air gap is defined by a spacer structure whose position and thickness are precisely defined. Neither the position nor the thickness of the spacer structure changes over time and with use, and under the normal conditions experienced in service. The present approach is readily implemented in production-scale operations at a reasonable cost. The present approach is preferably implemented in an air-gap prism structure, but it may be used in other applications such as air-gap lens doublets and Phillips color prisms, for example.

In accordance with the invention, an air-gap optical structure comprises a first transmissive optical element, a second transmissive optical element, and a spacer structure having a spacer thickness and disposed between the first transmissive optical element and the second transmissive optical element so as to define an air gap therebetween having the spacer thickness. The spacer structure comprises a metallic structure having a first layer made of a first material contacting the first transmissive optical element, and a second layer made of a second metal contacting the second transmissive optical element. The first material is preferably the metal iron, but it may be any operable material, and the second metal is preferably nickel.

The spacer thickness is preferably from about 5 to about 15 micrometers, but it may be larger or smaller. The first layer typically has a first-layer thickness of less than about 1 micrometer, and the second layer typically has a second-layer thickness of the balance of the spacer thickness, and normally from about 5 to about 15 micrometers. The first layer preferably has a vapor deposited microstructure, and the second layer preferably has an electroless-deposited microstructure. The shape of the spacer structure may be of any desired form, but its preferably comprises at least three, and most preferably exactly four, pads.

A method for fabricating an air-gap optical structure comprises the steps of furnishing a first transmissive optical element, furnishing a second transmissive optical element, depositing a spacer structure on the first transmissive optical element, and contacting the second transmissive optical element to the spacer structure so that the spacer structure lies between the first transmissive optical element and the second transmissive optical element and defines an air gap therebetween. The step of depositing the spacer structure includes the steps of depositing a first layer made of a first material onto the first transmissive optical element, and depositing a second layer made of a second metal onto the first layer. The first layer is preferably deposited by vapor deposition, and the second layer is preferably electroless-deposited upon the first layer. The thickness are preferably as set forth previously.

The present approach results in an air-gap optical structure wherein the transmissive optical elements are spaced apart by the metallic spacer structure having two or more metallic layers. The elements of the spacer structure are deposited in place upon the first transmissive optical element, and consequently their positions cannot later shift during service. The spacer structure is metallic and preferably made of metals that do not substantially deform under the normal service conditions of the air-gap optical structure, so that the thickness of the air gap does not change over time and in service. The air-gap optical structure is therefore highly stable. The metallic layers are deposited by techniques that define their thicknesses precisely, so that the thickness of the air gap is defined precisely and there is no optical wedge effect resulting from variations in the thicknesses of the various portions of the spacer structure. By contrast, techniques that use shims or spacer balls to define the air gap usually result in the undesirable optical wedge effect because their thicknesses cannot be controlled to the same degree of precision as can the spacer structure of the present approach. The present approach also results in spacer thicknesses that are very precisely defined and may be selected for particular applications. On the other hand, shims and spacer balls are usually available only in sizes selected by their manufacturers, which may not be suitable for particular optical-gap applications.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
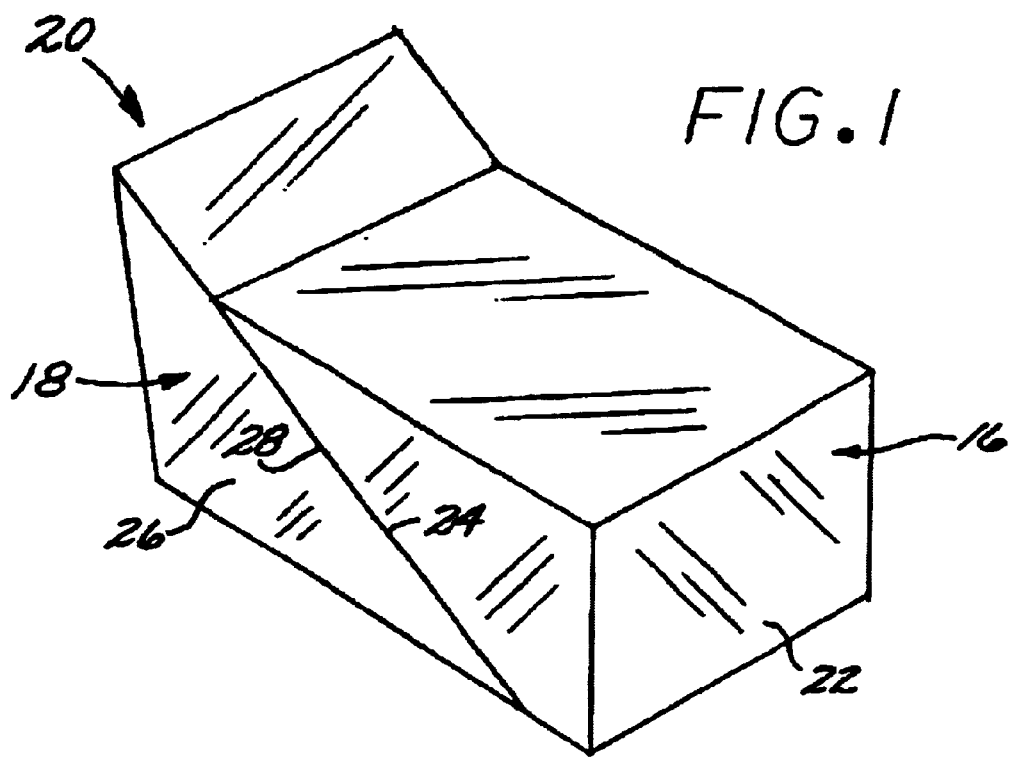
FIG. 1 is a perspective view of an air-gap optical structure.

FIG. 1 depicts an air-gap optical structure 20 including a first transmissive optical element 16 and a second transmissive optical element 18. In the preferred embodiment, the first transmissive optical element 16 is a first prism 22 having a first-prism air-gap face 24, and the second transmissive optical element 18 is a second prism 26 having a second-prism air-gap face 28. The air-gap faces 24 and 28 are in a facing relationship. As depicted in the schematic elevational view of FIG. 2, there is an air gap 30 between the air-gap faces 24 and 28. The present approach may be utilized in relation to other air-gap optical structures, for example air-gap lens doublets where the air gap separates two lenses, and Phillips color prisms utilizing multiple prisms. The application of the most interest currently is the air-gap prism structure using the prisms 22 and 26, which will be described in detail.

Figure 2:
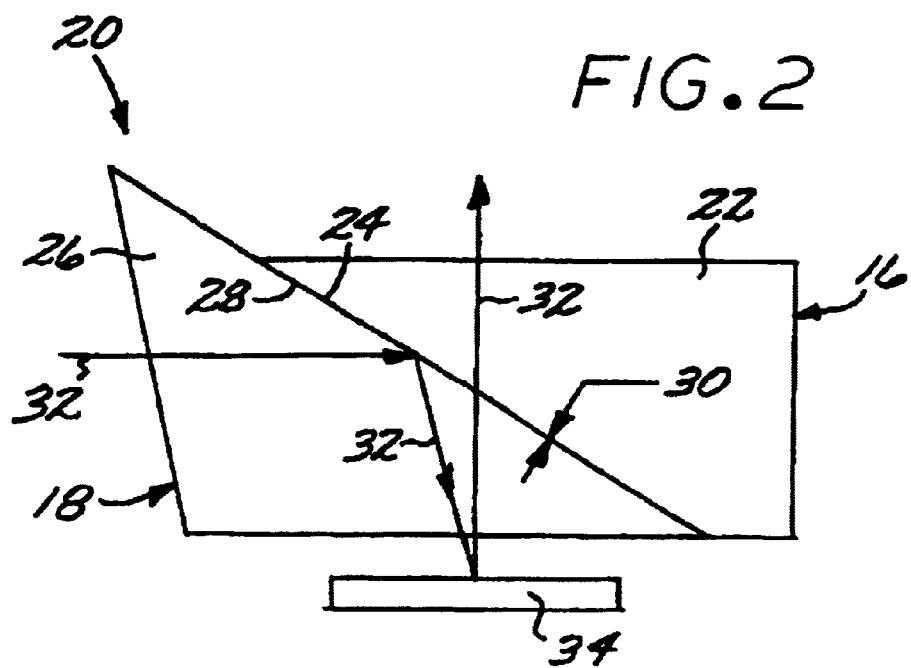
FIG. 2 is a schematic side elevational view of the air-gap optical structure, illustrating a light path in a projection application and the location of the air gap.

FIG. 2 also shows a schematic ray path for a typical projector application of the air-gap optical structure. A light beam 32 enters the second prism 26 and reflects from the second-prism air-gap face 24 at the proper angle to achieve total internal reflection (TIR). The light beam 32 leaves the second prism 26, reflects from a DMD or other type of image source 34, reenters the second prism 26, and passes through the second-prism air-gap face 28 and the first-prism air-gap face 24 at the proper angle to achieve transmission through the air-gap faces. The light beam 32 passes out of the first prism 22 for viewing or projection. The angularly dependent TIR/transmission properties of the facing air-gap faces 24 and 28 are achieved by positioning the two air-gap faces 24 and 28 parallel to each other and spaced apart by the air gap 30 having an air-gap spacing dimension that is typically from about 5 to about 15 micrometers, and most preferably about 10 micrometers. The present approach may be used, however, to define thicker or thinner air gaps 30.

Figure 3:
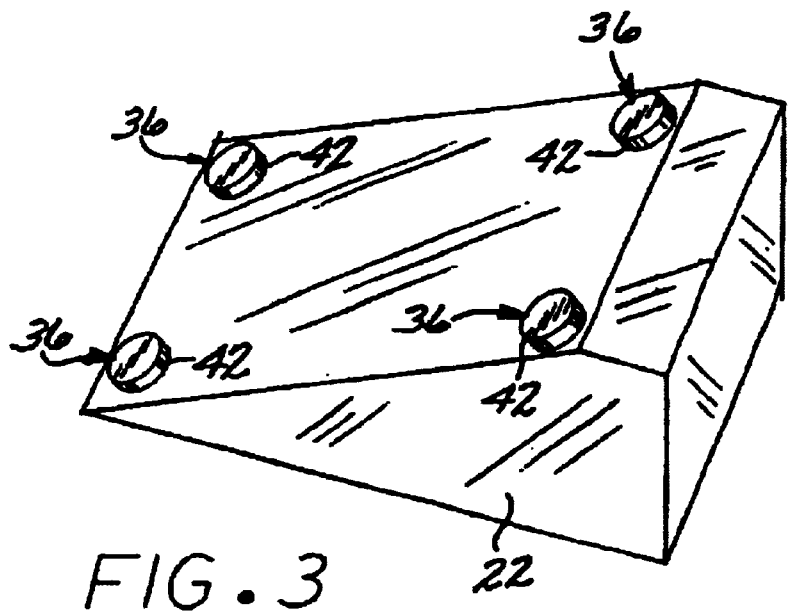
FIG. 3 is a perspective view of the first prism isolated from the second prism of the air-gap optical structure, illustrating the preferred location of the spacers.
Figure 4:
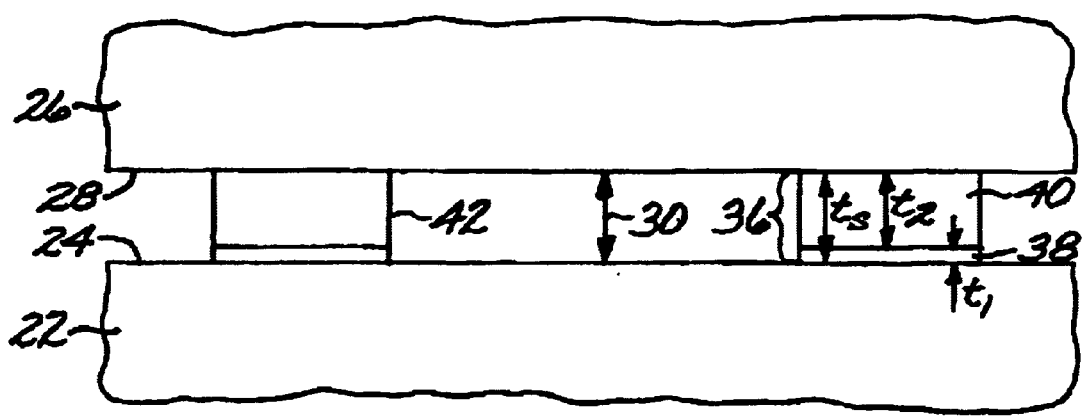
FIG. 4 is a greatly enlarged side sectional view of two of the spacers between the two prisms.

As illustrated in FIGS. 3–4, a spacer structure 36 having a spacer thickness $t_s$ is disposed between the first prism 22 and the second prism 26 so as to define the air gap 30 therebetween having the same thickness as the spacer thickness $t_s$. The spacer structure 36 preferably comprises a metallic structure having a first layer 38 with a first-layer thickness $t_1$ and made of a first material and contacting the first prism 22, and a second layer 40 made of a second metal with a second-layer thickness $t_2$ and contacting the second prism 26. (Equivalently for the present purposes, the first layer 38 may contact the second prism 26, and the second layer 40 may contact the first prism 22.)

The spacer structure 36 is preferably provided in the form of pads 42 deposited on the first-prism air-gap face 24 (or equivalently on the second-prism air-gap face 28). There are preferably at least three pads 42 to form at least a triangular standoff support between the two prisms 22 and 26. In the illustrated embodiment of FIG. 3, there are exactly four pads 42.

The spacer thickness $t_s$ is selected to produce the desired thickness $t_s$ of the gap 30. In the usual case, the spacer thickness $t_s$ is from about 5 to about 15 micrometers, and most preferably about 10 micrometers. The present approach may be used to form thicker or thinner spacer structures 36, but it is most advantageously applied to make spacer structures that are in this range of about 5–15 micrometers. Spacer structures in this range cannot practically be made using shims, spacer balls, and the like, both because the required shims and spacer balls are not readily available and because they cannot be handled and positioned in a production setting. Spacings smaller than about 5 micrometers are more advantageously achieved with single-layer spacer structures.

The spacer thickness $t_s$ is preferably not evenly divided between the first-layer thickness $t_1$ and the second-layer thickness $t_2$. Instead, the first-layer thickness $t_1$ is preferably much smaller than the second-layer thickness $t_2$ as a result of the preferred fabrication approach to be discussed subsequently. Typically, the first layer 38 has its first-layer thickness $t_1$ of less than about 1 micrometer, and the second layer 40 has its second-layer thickness $t_2$ of greater than about 5 micrometers, and preferably from about 5 to about 15 micrometers. The first layer 38 is preferably iron, and the second layer 40 is preferably the second metal selected from the group of nickel, iron, and copper.

Figure 5:
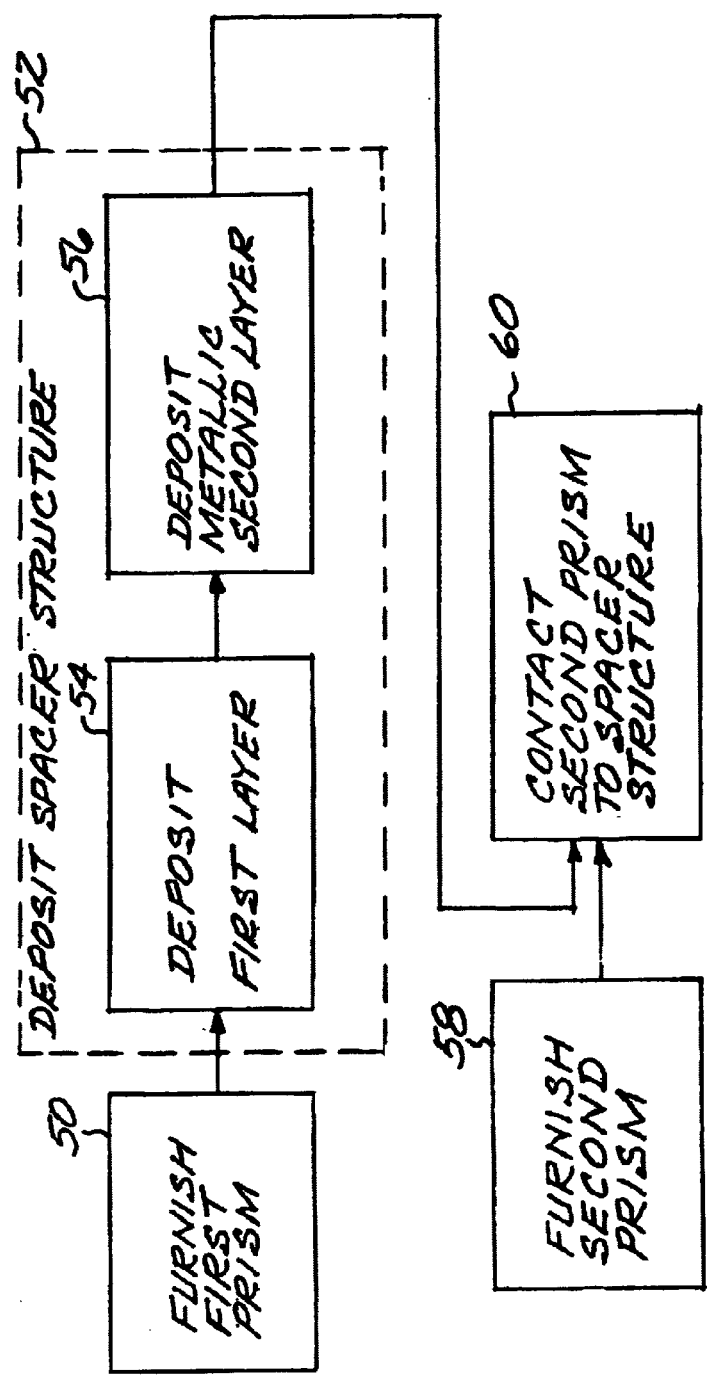
FIG. 5 is a block flow diagram of a preferred approach for fabricating the air-gap optical structure.

FIG. 5 depicts a preferred approach for practicing the invention. The prior discussion of features is incorporated herein. The first prism 22 is furnished, step 50. The first prism 22 is formed of a material that is transparent to the light wavelengths of interest For example, for visible light the first prism 22 may be glass, and for infrared light the first prism may be silicon. The first prism 22 is fabricated to the desired shape and size according to the selected material by known techniques such as casting, machining, and/or crystal growth.

The spacer structure 36 is deposited upon the first prism 22, step 52 (or equivalently, upon the second prism 26). The depositing step 52 is preferably accomplished by a two-step process in which the first layer 38 is deposited onto the first-prism air-gap face 24, step 54, and thereafter the second layer 40 is deposited onto the first layer 38, step 56. The first layer 38 is deposited, step 54, by any operable approach, with vapor deposition through a mask to define the locations and cross-sectional shapes and sizes of the pads 42 being preferred. An example is electron beam physical vapor deposition through a mask. Iron is the preferred material for the first layer 38, but other metals and nonmetals that are compatible with the formation of the second layer 40, and in this case catalyze its deposition, may be used as well.

The second layer 40 is thereafter deposited, step 56, by any operable approach, with catalyzed electroless deposition of nickel being preferred. Catalyzed electroless deposition of nickel is well known in the art for other applications. The catalyzed electroless deposition of nickel occurs only on the deposited first layer 40, and therefore only deposits on the areas of the pads 42 that were previously deposited in step 54. This type of multi-layered deposition is preferred because while electroless deposition is a relatively rapid and readily controlled deposition approach, it cannot deposit directly onto an electrically nonconducting substrate such as the prisms 22 and 26. The deposition of the first layer 38 provides a base upon which the second layer 40 may be electroless deposited. The vapor deposition of the first layer 38 is relatively slow, but it is accomplished upon the electrically nonconducting prisms 22 or 26. For these reasons, the first layer 38 is selected to be relatively much thinner than the second layer 40. The result is the metallic spacer structure 36 that is deposited upon the electrically nonconducting prisms 22 and 26 in an economic and highly controlled manner. Additionally, both of these deposition procedures may be performed with a high degree of precision as to the location of the deposition and the thickness of the deposit. The location and thickness of the spacer structure 36 may therefore be determined very precisely by the deposition approach.

Figure 6:
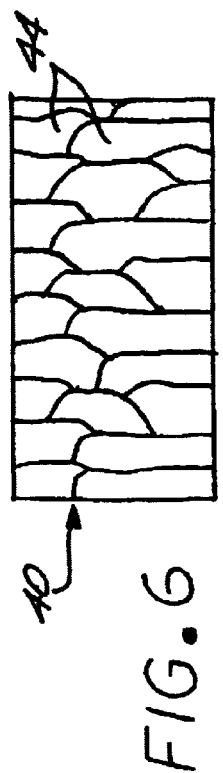
FIG. 6 is an idealized microstructure of an electroless-deposited structure.

In the preferred approach, the vapor deposited first layer 38 has a single-crystal or fine polycrystalline structure. As seen in FIG. 6, the electroless-deposited second layer 40 has an elongated polycrystalline structure 44 with the direction of elongation extending across the air gap 30 and thence parallel to the direction of the measurement of the thickness $t_2$.

After the spacer structure 36 is deposited in step 52, the second prism 26 is furnished, step 58. The second prism 26 is prepared in a manner like that of the first prism 22, and the prior description in relation to the first prism 22 is incorporated here.

The second prism 26 is thereafter contacted, step 60, to the spacer structure 36 already deposited on the first prism 22, so that the spacer structure 36 lies between the first prism 22 and the second prism 26 and defines the air gap 30 therebetween. Optionally, the structure of the first prism 22, the second prism 26, and the spacer structure 36 may be held together as an integral unit by any operable approach. A preferred approach is to bond side plates onto the sides of the air-gap optical structure 20.

The present approach has been practiced to build air-gap optical structures 20, and specifically air-gap prism structures, with the air-gap spacing between the prisms 22 and 26 of from about 5 to about 15 micrometers. The air-gap spacing was arbitrarily selectable, and there was no observed optical wedge-effect aberrations resulting from variations in the thicknesses of the pads 42 that define the air gap 30. Such variations and wedge effects are encountered when using shim-based or spacer-ball techniques, as there is always some small variation in the thicknesses of the shims or the spacer balls, often due to manufacturing variations, fine burrs on the edges, and the like. This variation in thickness and its associated wedge-effect aberrations are particularly troublesome when the light beam passes through the air-gap optical structure several times, as in the illustrated prism structure and also in common applications of Phillips color prism structures.

It was not possible to build comparable air-gap prism structures using shims or spacer balls, inasmuch as shims and spacer balls in this size range were not readily available. However, experience in building air-gap prism structures with air-gap spacings of 20 micrometers or greater suggests that the present approach produces the air-gap prism structure with a more uniform air-gap spacing over the entire area of the air gap 30, than possible using shims or spacer balls. The present approach is also less expensive to perform than shim or spacer-ball approaches, because the deposition technique may be extended to the simultaneous deposition of many spacer structures on different prisms, and because the pads 42 do not shift in position during assembly and over time in service.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An air-gap optical structure, comprising:
    a first transmissive optical element;
    a second transmissive optical element; and
    a spacer structure having a spacer thickness and disposed between the first transmissive optical element and the second transmissive optical element so as to define an air gap therebetween having the spacer thickness, the spacer structure comprising a metallic structure having
        a first layer made of a first material contacting the first transmissive optical element, and
        a second layer made of a second metal contacting the second transmissive optical element.

2. The optical structure of claim 1, wherein the spacer thickness is from about 5 to about 15 micrometers.

3. The optical structure of claim 1, wherein the first layer has a first-layer thickness of less than about 1 micrometer.

4. The optical structure of claim 1, wherein the second layer has a second-layer thickness of from about 5 to about 15 micrometers.

5. The optical structure of claim 1, wherein the second layer has an electroless-deposited microstructure.

6. The optical structure of claim 1, wherein the spacer structure comprises at least three pads.

7. The optical structure of claim 1, wherein the first transmissive optical element is a first prism, and the second transmissive optical element is a second prism.

8. An air-gap optical structure, comprising:
    a first prism;
    a second prism; and
    a spacer structure having a spacer thickness of from about 5 to about 15 micrometers and disposed between the first prism and the second prism so as to define an air gap therebetween having the spacer thickness, the spacer structure being a metallic structure having
        a first layer made of a first material having a first-layer thickness of less than about 1 micrometer and contacting the first prism, and
        a second layer made of a second metal having a second-layer first side contacting the first layer and a second-layer second side contacting the second prism.

9. The optical structure of claim 8, wherein the second layer has a thickness of greater than about 5 micrometers.

10. The optical structure of claim 8, wherein the second layer has an electroless-deposited microstructure.

11. The optical structure of claim 8, wherein the spacer structure comprises at least three pads.

12. A method for fabricating an air-gap optical structure comprising the steps of:
    furnishing a first transmissive optical element;
    furnishing a second transmissive optical element;
    depositing a spacer structure on the first transmissive optical element by the steps of
        depositing a first layer made of a first material onto the first transmissive optical element, and
        depositing a second layer made of a second metal onto the first layer; and
    contacting the second transmissive optical element to the spacer structure so that the spacer structure lies between the first transmissive optical element and the second transmissive optical element and defines an air gap therebetween.

13. The method of claim 12, wherein the step of depositing the first layer includes the step of depositing the first layer by vapor deposition.

14. The method of claim 12, wherein the step of depositing the second layer includes the step of electroless depositing the second layer.

15. The method of claim 12, wherein the step of depositing the first layer includes the step of depositing the first layer by vapor deposition, and wherein the step of depositing the second layer includes the step of electroless-depositing the second layer.

16. The method of claim 12, wherein the step of depositing the spacer structure includes the step of depositing the spacer structure to a thickness of from about 5 to about 15 micrometers.

17. The method of claim 12, wherein the step of depositing the first layer includes the step of depositing the first layer to a thickness of less than about 1 micrometer.

18. The method of claim 12, wherein the step of depositing the second layer includes the step of depositing the second layer to a thickness of greater than about 5 micrometers.

19. The method of claim 12, wherein the step of depositing the spacer structure comprises the step of depositing the spacer structure in the form of at least three pads.

20. The method of claim 12, wherein the step of furnishing a first transmissive optical element includes the step of furnishing a first prism, and wherein the step of furnishing a second transmissive optical element includes the step of furnishing a second prism.

\* \* \* \* \*